US012729969B2

(12) United States Patent
Beaurepaire et al.

(10) Patent No.: US 12,729,969 B2
(45) Date of Patent: Sep. 8, 2026

(54) METHOD TO DETERMINE CONTEXTUAL ROAD CLEARANCE FOR ELECTRICAL VEHICLES

(71) Applicant: HERE GLOBAL B.V., Eindhoven (NL)

(72) Inventors: Jerome Beaurepaire, Nantes (FR); Jeremy Michael Young, Beverly Hills, MI (US)

(73) Assignee: HERE GLOBAL B.V., Eindhoven (NL)

( * ) Notice: Subject to any disclaimer, the term of this patent is extended or adjusted under 35 U.S.C. 154(b) by 76 days.

(21) Appl. No.: 18/817,223

(22) Filed: Aug. 28, 2024

(65) Prior Publication Data

US 2026/0063435 A1 Mar. 5, 2026

(51) Int. Cl.
*G01C 21/34* (2006.01)
*B60W 50/14* (2020.01)
(Continued)

(52) U.S. Cl.
CPC ......... *G01C 21/3469* (2013.01); *B60W 50/14* (2013.01); *G06N 3/096* (2023.01); *G06N 20/00* (2019.01); *H04W 4/021* (2013.01)

(58) Field of Classification Search
CPC ................ G01C 21/34; G01C 21/3469; G01C 21/3476; G01C 21/3484; G06N 20/00;
(Continued)

(56) References Cited

U.S. PATENT DOCUMENTS 9,514,651 B2 12/2016 Linder et al.
9,751,424 B2 9/2017 Crombez
(Continued)

FOREIGN PATENT DOCUMENTS

WO 2022251865 A9 12/2022

OTHER PUBLICATIONS

Sarrafan et al., "An Intelligent Driver Alerting System for Real-time Range Indicator Embedded in Electric Vehicles", IEEE Industry Applications Society Annual Meeting, Oct. 2-6, 2016, pp. 1-7.
(Continued)

*Primary Examiner* — Hai H Huynh
*Assistant Examiner* — Johnny H Hoang
(74) *Attorney, Agent, or Firm* — Michael Yu; HERE GLOBAL B.V.

(57) ABSTRACT

A system to determine a stranded electric vehicle resilience index of an area for an electric vehicle (EV) is disclosed. The system may use an API to determine areas in a region with minimal EV charging capabilities; generate a first trained machine learning model to predict a first probability for a given EV to be stranded in the areas based on a training feature dataset and the areas with minimal EV charging capabilities; label the areas as critical areas based on the first probability; generate a second trained machine learning model based on the labelled critical areas; and predict, using the second trained machine learning model and current features of a link to be traveled by the EV as derived from a map and one or more sensors along the link, a second probability for the EV to be stranded on the link.

20 Claims, 4 Drawing Sheets

(51) Int. Cl.

| | |
|---|---|
| ***G06N 3/09*** | (2023.01) |
| ***G06N 3/096*** | (2023.01) |
| ***G06N 20/00*** | (2019.01) |
| ***H04W 4/02*** | (2018.01) |
| ***H04W 4/021*** | (2018.01) |

(58) Field of Classification Search

CPC ...... G06N 3/096; B60W 50/14; B60W 50/08; B60W 60/0023; H04W 4/021; B60L 2240/622; B60L 2260/52; B60L 50/60; B60L 53/60; B60L 53/80; Y02T 10/70

USPC ................. 701/410, 411, 414, 423, 424, 123

See application file for complete search history.

(56) References Cited

U.S. PATENT DOCUMENTS

| | | | | |
|---|---|---|---|---|
| 9,766,625 | B2 | 9/2017 | Boroditsky et al. | |
| 10,185,323 | B2 | 1/2019 | Stefan | |
| 10,471,968 | B2 | 11/2019 | Krishnan et al. | |
| 2010/0094496 | A1* | 4/2010 | Hershkovitz | B60L 50/66 701/22 |
| 2013/0179057 | A1* | 7/2013 | Fisher | B60L 53/66 701/1 |
| 2015/0039391 | A1* | 2/2015 | Hershkovitz | G01R 31/382 705/7.31 |
| 2020/0139845 | A1 | 5/2020 | Henrichs et al. | |
| 2022/0194401 | A1 | 6/2022 | Gee et al. | |
| 2022/0318859 | A1* | 10/2022 | Telpaz | G06Q 30/0281 |
| 2023/0024900 | A1* | 1/2023 | Ayoola | B60L 55/00 |
| 2023/0051766 | A1* | 2/2023 | Beaurepaire | G06Q 10/04 |
| 2023/0128979 | A1* | 4/2023 | Kinsey | B60L 53/80 320/109 |
| 2023/0211693 | A1* | 7/2023 | Ahtikari | H04W 12/069 |
| 2023/0215225 | A1* | 7/2023 | Filipowicz | B60R 16/023 701/29.6 |
| 2024/0010099 | A1* | 1/2024 | Peterman | G06Q 10/04 |
| 2024/0070198 | A1* | 2/2024 | Roy | H04W 24/02 |
| 2024/0219191 | A1* | 7/2024 | Eylander | G01C 21/3453 |

OTHER PUBLICATIONS

González et al., “Understanding the Effect of Traffic Congestion on Accidents Using Big Data”, Sustainability, vol. 13, Jul. 5, 2021, pp. 1-19.

“IEEE 802.11” Wikipedia, Retrieved on Aug. 8, 2024, Webpage available at https://en.wikipedia.org/wiki/IEEE_802.11.

“IEEE 802.16” Wikipedia, Retrieved on Jul. 23, 2024, Webpage available at https://en.wikipedia.org/wiki/IEEE_802.16.

“IMT-2020” Wikipedia, Retrieved on Jun. 13, 2024, Webpage available at https://en.wikipedia.org/wiki/IMT-2020.

* cited by examiner

METHOD TO DETERMINE CONTEXTUAL ROAD CLEARANCE FOR ELECTRICAL VEHICLES

TECHNOLOGICAL FIELD

An example aspect of the present disclosure generally relates to promoting vehicle safety for electric-powered vehicles, and more particularly, but without limitation relates to a system, a method, and a computer program product to determine contextual road clearance for electrical vehicles in certain areas and situations and an electrical vehicle resilience index for such areas.

BACKGROUND

As more and more electrical vehicles (EVs) will be on the roads and their range still being limited, it will be important to make sure such EVs are not running out of battery power in areas which can cause important traffic jams, deadlock situations or other dangerous situations.

There are several steps users can do to avoid running out of battery in an EV:

1. Plan the route: Use a mapping application or route planner to determine the most efficient route, taking into account factors such as distance, elevation and traffic.
2. Charge regularly: Make it a habit to charge the EV vehicle whenever the opportunity, even if the battery is not yet fully depleted. This will help ensure a sufficient charge to reach the destination.
3. Use energy-saving features: Many electric vehicles have energy-saving features, such as regenerative braking, which can help extend the range of the battery.
4. Limit unnecessary weight: Extra weight in the vehicle can reduce the range of the battery, so try to travel light and remove any unnecessary items from the car.
5. Use a portable charger: If are concerned about running out of battery power on a long trip, consider purchasing a portable charger that can give your electric vehicle a boost in case of an emergency and extend its travel range.

For city centers with narrow streets, EVs with (very) low battery levels need to stay outside of city centers because they may not have enough power to reach their destination. If an electrical vehicle runs out of battery while driving in a city center with narrow streets, it could cause traffic disruptions and delays. Additionally, the vehicle may not be able to move, which could cause further problems for other drivers and pedestrians.

To avoid these issues, it is best for electrical vehicles with low battery levels to stay outside of city centers with narrow streets. This will help to ensure that the vehicle has enough power to reach its destination and that it does not cause any traffic or safety issues in the process. If charging before this area is not an option, users should consider intermodal options like Park and Ride, i.e. using public transport when possible.

EVs with low battery levels need to stay outside of highways for several reasons. First, highways typically have higher speed limits than other roads, which means that EVs with low battery levels may not be able to maintain the required speed. This could make the vehicle a danger to other drivers and could cause accidents. Additionally, highways often have long stretches with no charging stations, which means that if an EV with low battery levels gets stuck on the highway, it may not be able to recharge and could be stranded. Finally, highways typically have a higher volume of traffic, which means that if an electrical vehicle with low battery levels breaks down, it could cause significant traffic disruptions. To avoid these issues, it is best for electrical vehicles with low battery levels to stay outside of highways.

Moreover, there are reported instances of EVs with no available battery power with blocked wheels as a result, making it even harder to move or get towed—which in itself is an inconvenient and expensive proposition compared to conventional vehicles. In addition, in certain brands of EV, a driver may be locked out of the EV when there is insufficient electrical power to be drawn from the battery, leaving the driver unable to enter to put the vehicle in neutral or "tow" mode, if available.

In addition, traffic jams themselves can be the cause of vehicles being stranded—e.g. staying hours in a long traffic jams with air conditioning on.

It is clear that EV drivers need to be constantly aware of their charge level and get an understanding of what is ahead of them as well as when the next charging opportunity will present itself. Therefore, a need exists for a way to warn users upfront that they should not enter a given area/road/city center without a minimum battery level.

BRIEF SUMMARY

The present disclosure provides a system, a method and a computer program product to determine a stranded electric vehicle resilience index of an area for an EV, in accordance with various aspects.

Aspects of the disclosure provide a computer implemented method to determine a stranded electric vehicle resilience index of an area for EV. The method may include determining, from an application programming interface (API), one or more areas in a region with minimal EV charging capabilities; generating a first trained machine learning model to predict a first probability for a given EV to be stranded in the one or more areas based on a training feature dataset and the one or more areas in a region with minimal EV charging capabilities; labelling the one or more areas as one or more critical areas based on the first probability for the given EV to be stranded in the one or more areas; generating a second trained machine learning model based on the labelled one or more critical areas; and predicting, using the second trained machine learning model and current features of a link to be traveled by the EV as derived from a map and one or more sensors along the link, a second probability for the EV to be stranded on the link.

Aspects of the disclosure may provide a system to determine a stranded electric vehicle resilience index of an area for an EV. The system may include at least one memory configured to store computer executable instructions; and at least one processor configured to execute the computer executable instructions to: determine, from an API, one or more areas in a region with minimal EV charging capabilities; generate a first trained machine learning model to predict a first probability for a given EV to be stranded in the one or more areas based on a training feature dataset and the one or more areas in a region with minimal EV charging capabilities; label the one or more areas as one or more critical areas based on the first probability for the given EV to be stranded in the one or more areas; generate a second trained machine learning model based on the labelled one or more critical areas; and predict, using the second trained machine learning model and current features of a link to be traveled by the EV as derived from a map and one or more sensors along the link, a second probability for the EV to be stranded on the link.

Aspects of the disclosure may provide a computer program product comprising a non-transitory computer readable medium having stored thereon computer executable instructions, which when executed by one or more processors, cause the one or more processors to carry out operations to determine a stranded electric vehicle resilience index of an area for an EV. The operations may include operations for determining, from an API, one or more areas in a region with minimal EV charging capabilities; generating a first trained machine learning model to predict a first probability for a given EV to be stranded in the one or more areas based on a training feature dataset and the one or more areas in a region with minimal EV charging capabilities; labelling the one or more areas as one or more critical areas based on the first probability for the given EV to be stranded in the one or more areas; generating a second trained machine learning model based on the labelled one or more critical areas; and predicting, using the second trained machine learning model and current features of a link to be traveled by the EV as derived from a map and one or more sensors along the link, a second probability for the EV to be stranded on the link.

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Figure 1:
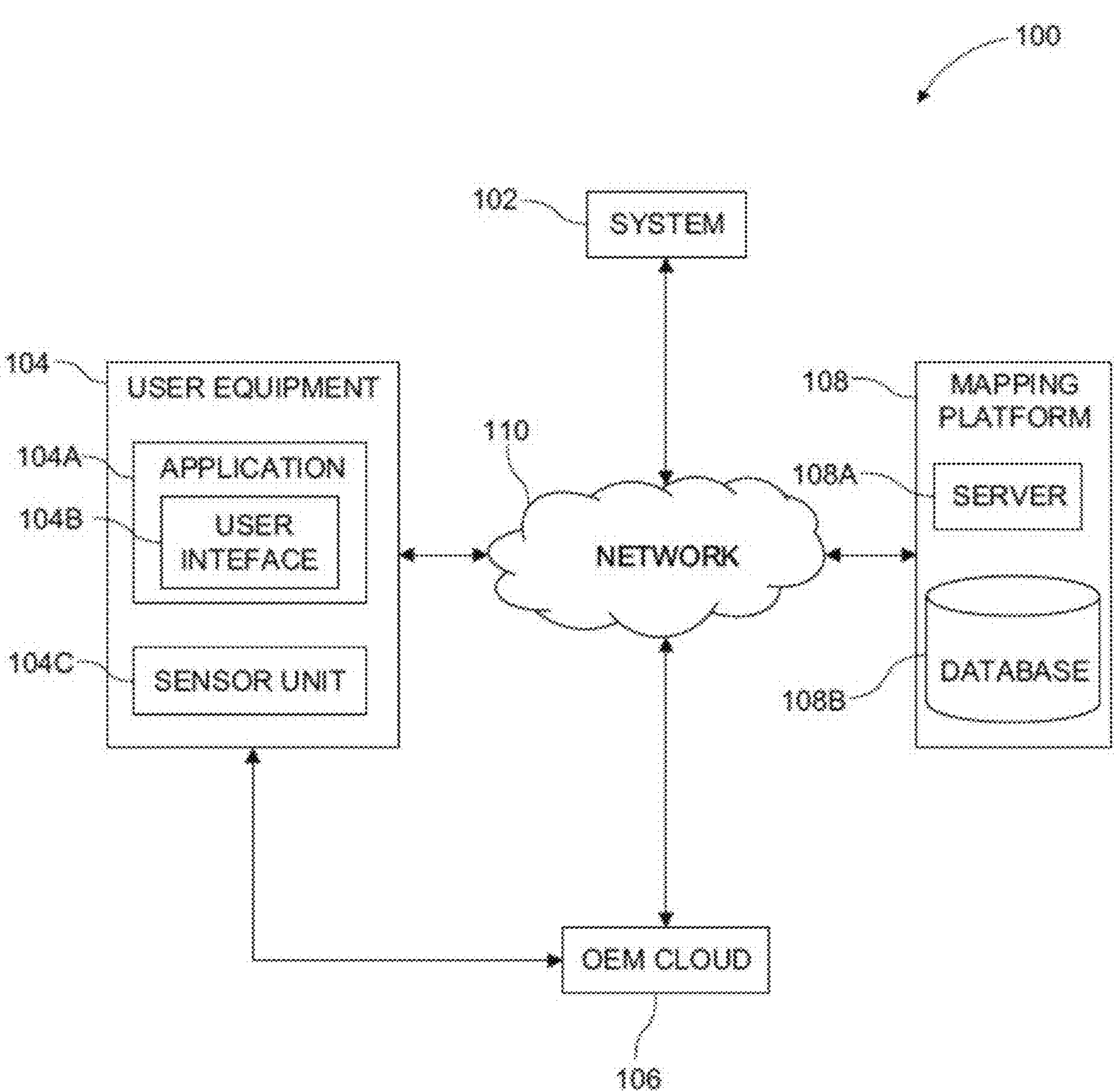
Figure 2:
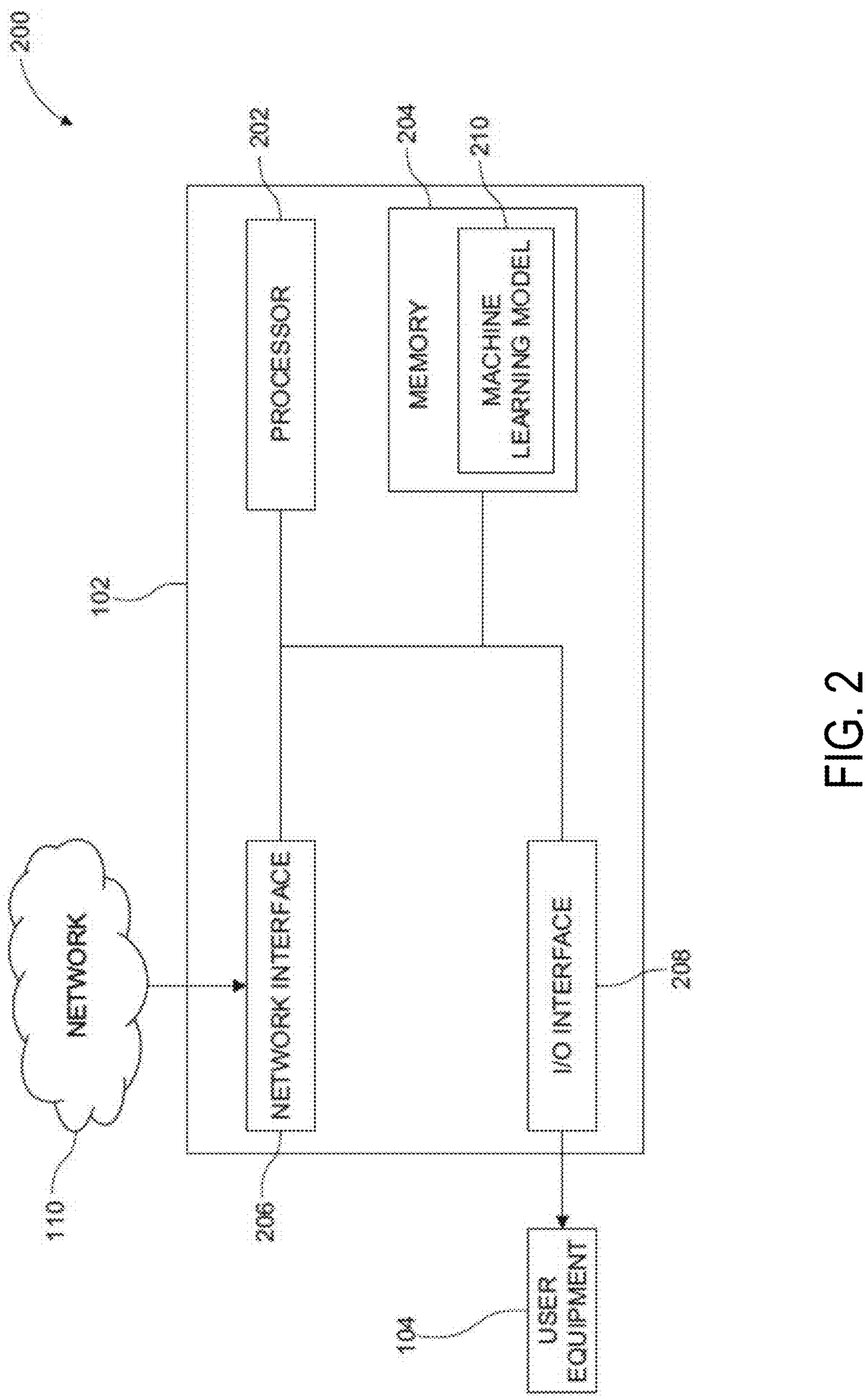
Figure 3:
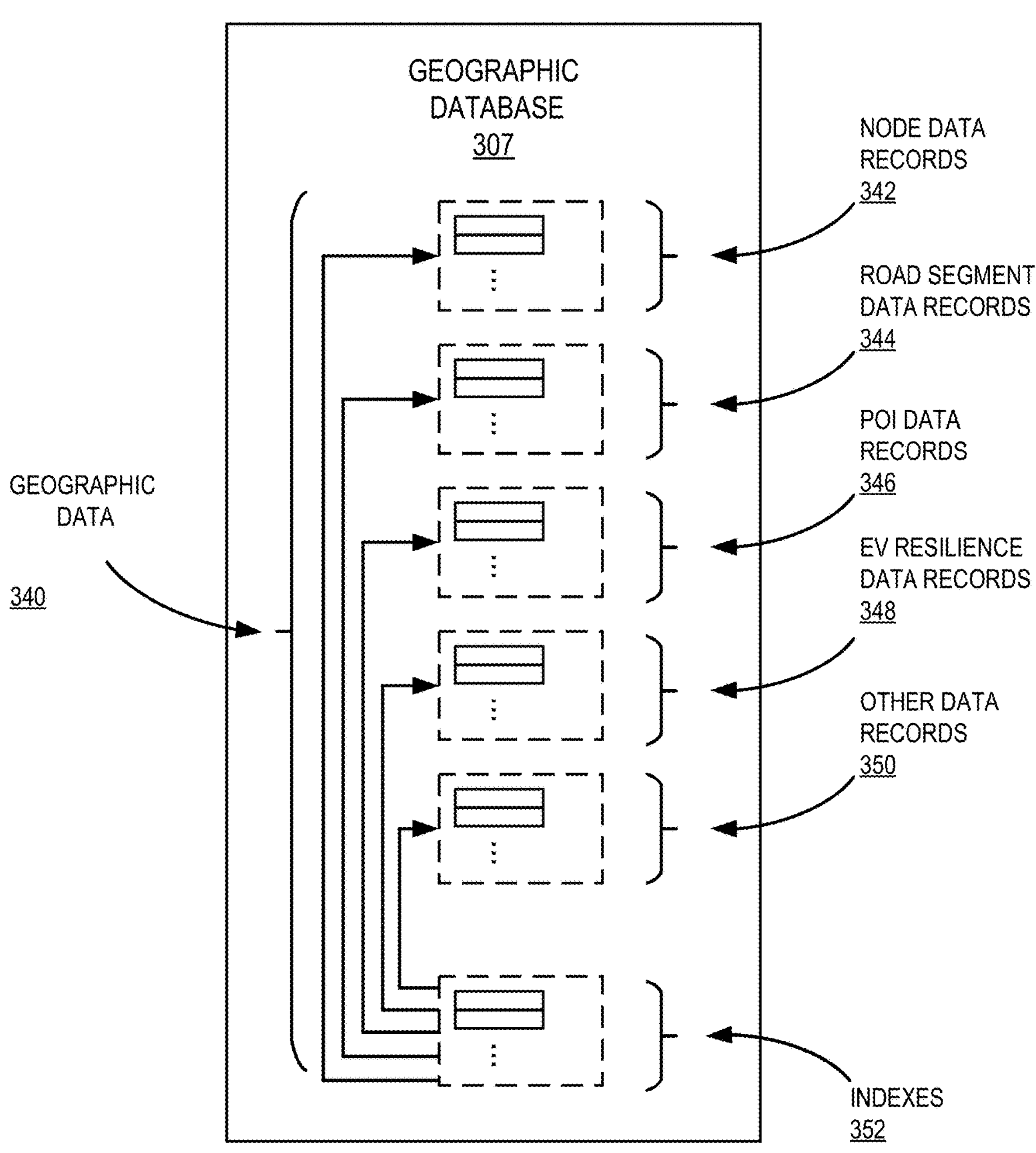
Figure 4:
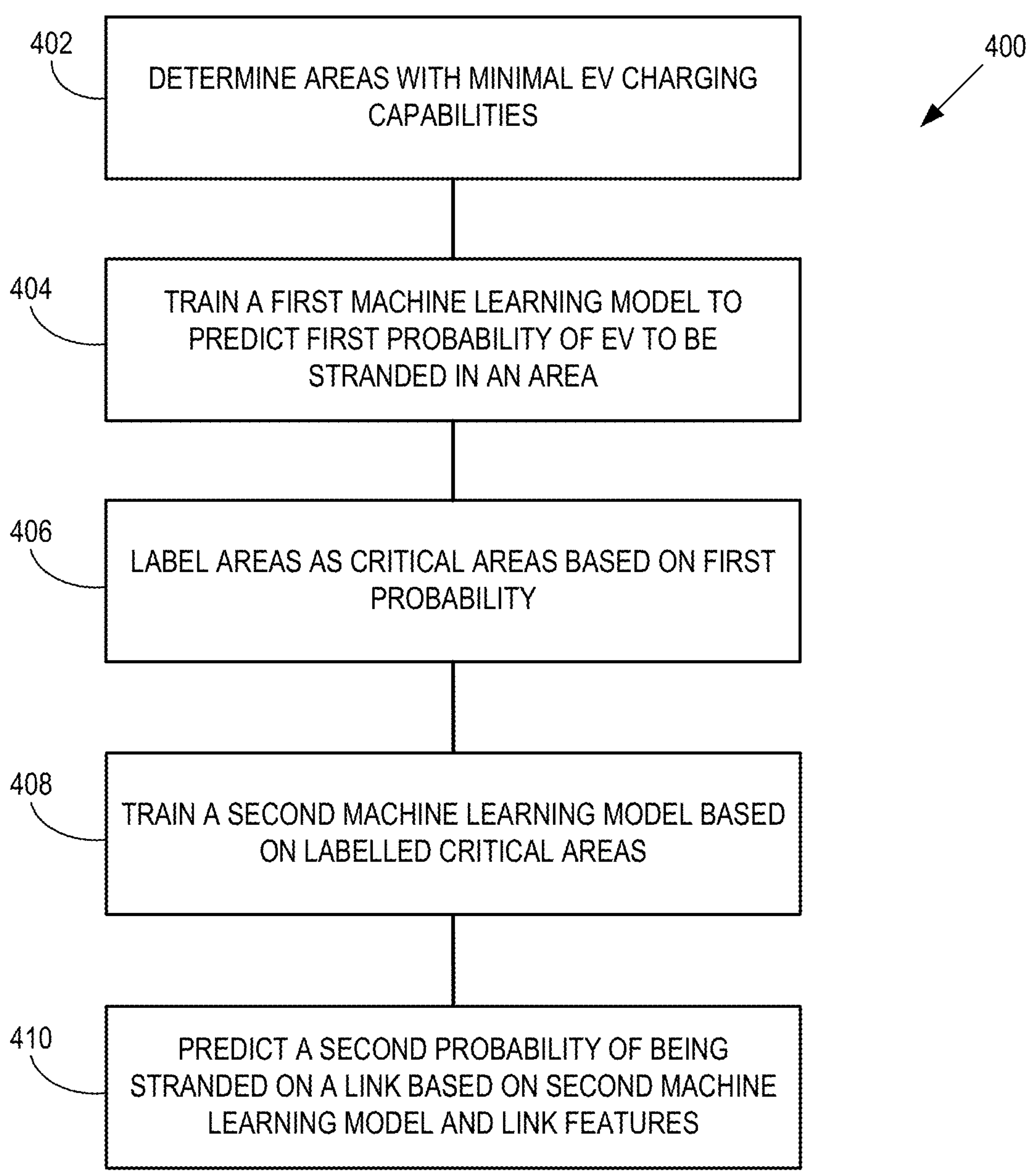

Having thus described certain aspects of the disclosure in general terms, reference will now be made to the accompanying drawings, which are not necessarily drawn to scale, and wherein:

FIG. 1 illustrates a schematic diagram of a network environment 100 of a system 102 for determining a stranded electric vehicle resilience index of an area for an EV in accordance with an example aspect;

FIG. 2 illustrates a block diagram of the system for determining a stranded electric vehicle resilience index of an area for an EV, in accordance with an example aspect;

FIG. 3 illustrates an example the map or geographic database for use by the system for determining a stranded electric vehicle resilience index of an area for an EV, in accordance with an example aspect; and FIG. 4 illustrates a flowchart 400 for acts taken in an exemplary method for determining a stranded electric vehicle resilience index of an area for an EV, in accordance with an aspect.

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, "vehicle" refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle (AV) may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In order to avoid significant traffic disruptions that get caused by stranded EVs, the disclosed system and method, in an aspect of the disclosure, may include an algorithm to determine the "disruptive" potential of a stranded vehicle in a given area, causing traffic jams on narrow streets or deadlock situations. This is referred to as a "stranded EV resilience index." In an aspect, the system and method may determine the annoyance level of a possibly stranded vehicle. This index may be contextually dependent, i.e., more disruptive at peak time versus in quiet moments. The system should evaluate the impact of a stranded car in a given area, such as when there is one lane one way only city center creating some bottleneck, on a very busy highway on a vacation departure day or at a toll road with no emergency lanes to stop when battery is empty. Such identified areas with such a potential to be disrupted will be called "critical areas" in the present disclosure.

In an aspect of the disclosure, the disclosed system may use existing "application programmer interfaces (APIs) to find out the areas with little to no EV charging capabilities (real-time availability) within those "Critical areas." For example, a city center has very few EVCP (EV charging points) and/or that all or most of them are not functional. This may lead to very difficult situations for EV owners who had counted on such EVCPs to be available. Many providers now supply this kind of data.

The disclosed system may determine the conditions which led to such situations in the past. In an aspect, A first machine learning (ML) model (ML-1) may be trained to predict the likelihood for a given EV to be stranded in a critical area. In an aspect, the ML-1 may consider the following features and parameters:

1. Vehicle type;
2. Vehicle model;
3. Battery level;
4. Battery capacity;
5. Battery model and type;
6. Car load;
7. Traffic conditions;
8. Weather conditions (temperature, snow);
9. Day/night;
10. Number of driving lanes;
11. Number of parking lanes on the link;
12. Functional classes (highway, city center, rural roads, etc);
13. Road width;
14. Presence of physical divider;
15. Vehicle speed;
16. Road curvature;
17. Road ascent/descent degree/slope;
18. Road works;
19. Presence of tree or infrastructure on the edge of the road (Yes/No); and/or
20. Type of vehicle (small car, sedan, small truck, truck, utility), among other possible parameters affecting the presence of "critical areas."

The disclosed system may label whether the EV has been stranded in a similar context. In an aspect, historical data may be collected for the features and the corresponding label.

In a further aspect of the disclosure, a second ML model may be trained on this data. Whenever a vehicle starts driving, the current features are extracted from maps and sensors and fed into the trained ML model. The second ML model is configured to predict whether the EV car will be stranded on a given link. In an aspect, the probability score of an EV being stranded may vary from 0 to 1.

In an aspect of the disclosure, the system may employ transfer learning using the trained MLs of the disclosed system. Once such models have been established, the system may employ transfer learning to benefit from the pre-trained MLs to be fine-tuned in areas where historical information is not available. The disclosed ML models may be used as a baseline until data can be collected in such an area and the model can then be adapted to better match the local behaviors.

In an aspect of the disclosure, the disclosed system may determine a minimum battery level which should guarantee an arrival to the next charging point—a destination or anywhere else—or else the ability for the EV to safely exit a "critical area." Based on historical data, the disclosed system may then make recommendation to the EV drivers to only engage in the "critical areas" with a minimum battery level.

This minimum battery level may be learned from past behaviors, such as based on predefined thresholds defined by the city authorities. In an aspect, the disclosed system would have enough data to derive contextual insights as the following for an area and thus may inform the decision making processes:

"99% of the EV which had a battery level above 15% managed to leave this critical area without causing major traffic disruptions in the last 3 years"

On the other end, the disclosed system may present conclusions such as:

"20% of the EV entering this critical area with less than 10% battery left ended up causing traffic disruptions leading to ETAs increased by >20 min for many people last year." Hence, historical data, used with real time availability of EV stations, may help determine the right battery levels to allow the highest number of people to enter those areas, without taking risks that may create major traffic jams in the area.

In an aspect, the disclosed system may provide an upfront notification system and user interfaces to assist EV drivers in avoiding "critical areas." In an aspect, the disclosed system may help EV drivers avoid such situations by anticipating such issues and recommending much earlier to recharge the battery, especially if a "critical area" needs to be crossed with a low battery level or if the destination is within a "critical area."

In an aspect, the disclosed system may provide user interfaces, where a driver may be notified about information related to EV battery levels and "critical areas" through an EV's IVI; by voice or audio information; on a mobile device; using augmented reality (AR) or windshield overlay; or other communication modalities.

In an aspect of the disclosure, the disclosed system may use mobility graph data (historical mobility patterns) to leverage historical information from a given user or set of users (e.g., commuters) who may tend to take the same routes, visit the same POIs or accomplish the same actions at the same locations due to habits. This information may help the disclosed system understand some of the mobility patterns and battery levels of the EV drivers in those "critical areas" or on highways. Such information about repeated patterns may be useful for the disclosed system to learn and make even more accurate predictions.

FIG. 1 illustrates a schematic diagram of a network environment 100 of a system 102 for determining a stranded electric vehicle resilience index of an area for an EV in accordance with an example aspect. The system 102 may be communicatively coupled with, a user equipment (UE) 104, an OEM cloud 106, a mapping platform 108, via a network 110. The UE 104 may be a vehicle electronics system, onboard automotive electronics/computers, a mobile device such as a smartphone, tablet, smart watch, smart glasses, laptop, wearable device or other UE platforms known to one of skill in the art. The mapping platform 108 may further include a server 108A and a database 108B. The user equipment includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for road and weather conditions in a region, that may be used to assist a user or driver to predict critical areas for EVs. Such features can also include a vehicle type; a vehicle model; a battery level; a battery capacity; a battery type; a car load; traffic conditions; weather conditions; a time of day; a number of driving lanes; a number of parking lanes on the link; a functional class of the link; a road width; a presence of physical divider; a vehicle speed; a road curvature; a road ascent/descent degree or slope; road work or road construction; a presence of a tree or infrastructure on an edge of the road or a combination thereof.

The system 102 may be communicatively coupled to the UE 104, the OEM cloud 106, and the mapping platform 108 directly via the network 110. Additionally, or alternately, in some example aspects, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud-based service or a cloud-based platform. As such, the system 102 may be configured to operate outside the UE 104. However, in some example aspects, the system 102 may be embodied within the UE 104. In each of such aspects, the system 102 may be communicatively coupled to the components shown in FIG. 1 to carry out the desired operations and wherever required modifications may be possible within the scope of the present disclosure.

The UE 104 may be a vehicle electronics system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 104 may comprise a processor, a memory and a network interface. The processor, the memory and the network interface may be communicatively coupled to each other. In some example aspects, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an aspect, the UE 104 may be directly coupled to the system 102 via the network 110. For example, the UE 104 may be a dedicated vehicle (or a part thereof) for gathering data for development of the map data in the database 108B. In some example aspects, the UE 104 may be coupled to the system 102 via the OEM cloud 106 and the network 110. For example, the UE 104 may be a consumer mobile phone (or a part thereof) and may be a beneficiary of the services provided by the system 102. In some example aspects, the UE 104 may serve the dual purpose of a data gatherer and a beneficiary device. The UE 104 may be configured to provide sensor data to the system 102. In accordance with an aspect, the UE 104 may process the sensor data for information that may be used for determining a stranded electric vehicle resilience index of an area for an EV, such as weather, traffic conditions, construction, community alerts, etc. Further, in accordance with an aspect, the UE 104 may be configured to perform processing related to determining a stranded electric vehicle resilience index of an area for an EV.

The UE 104 may include the application 104A with the user interface 104B to access one or more applications. The application 104B may correspond to, but not limited to, map related service application, navigation related service application and location-based service application. In other words, the UE 104 may include the application 104A with the user interface 104B. The user interface 104B may be a dedicated user interface configured to show potential locations or contexts of critical areas for EV travel with given battery levels. The user interface 104B may be in the form of a map depicting regions of critical areas for the EV, according to aspects of the disclosure.

The sensor unit 104C may be embodied within the UE 104. The sensor unit 104C comprising one or more sensors may capture sensor data, in a certain geographic location. In accordance with an aspect, the sensor unit 104C may be built-in, or embedded into, or within interior of the UE 104. The one or more sensors (or sensors) of the sensor unit 104C may be configured to provide the sensor data comprising location data associated with a location of a user. In accordance with an aspect, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, a proximity sensor, and a motion sensor.

The sensor data may refer to sensor data collected from a sensor unit 104C in the UE 104. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 102, to accurately receive the sensor data at the system 102. Additionally, or alternately, the sensor data of a UE 104 may correspond to movement data associated with a user of the user equipment. Without limitations, this may include motion data, position data, orientation data with respect to a reference and the like.

The mapping platform 108 may comprise suitable logic, circuitry, interfaces and code that may be configured to store map data associated with a geographic area in the region of interest related to geographic or other physical features that may lead to critical areas for EVs, etc. The map data may include traffic features and include historical (or static) traffic features such as road layouts, pre-existing road networks, business, educational and recreational locations, POI locations, historical and real-time weather conditions in the region or a combination thereof. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example aspects, the mapping platform 108 may periodically communicate with the UE 104 via the processing means to update a local cache of the map data stored on the UE 104. Accordingly, in some example aspects, map data may also be stored on the UE 104 and may be updated based on periodic communication with the mapping platform 108.

In an aspect, the map data may include, and the database 108B of the mapping platform 108 may store real-time, dynamic data about features to predict critical areas for EV drivers. For example, real-time data may be collected for determining a stranded electric vehicle resilience index of an area for an EV, such as traffic conditions; weather conditions; a time of day; a number of driving lanes; a number of parking lanes on the link; a functional class of the link; a road width; a presence of physical divider; a vehicle speed; a road curvature; a road ascent/descent degree or slope; road work or road construction; a presence of a tree or infrastructure on an edge of the road or a combination thereof, etc. Other data records may include computer code instructions and/or algorithms for executing a trained machine learning model that is capable of determining a stranded electric vehicle resilience index of an area for an EV.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example aspects, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent raised features and vehicle speed control indications, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures, topography and other visible features surrounding roads and streets, including raised features on the roads.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate aspects, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product may be configured to determine a driving decision may similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 2 illustrates a block diagram 200 of the system 102, exemplarily illustrated in FIG. 1, to determine a stranded electric vehicle resilience index of an area for an electric vehicle, in accordance with an example aspect. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor data associated with critical areas and link conditions for an EV. The sensor data may be captured by one or more UE, such as the UE 104. The processor 202 may be configured to determine a stranded electric vehicle resilience index and critical areas in the region of navigation, based on the sensor data. The processor 202 may be further configured to determine, using a trained machine learning model in conjunction with ground truth of the region, to predict a first probability for a given EV to be stranded in the one or more areas, where the ground truth of a region comprises current features of a link to be traveled by the EV, such as road conditions and features and EVCPs or lack thereof.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some aspects, the processor 202 may include one or more processing cores configured to perform independently. A multi-core processor may enable multiprocessing within a single physical package.

Additionally, or alternatively, the processor 202 may include one or more processors configured in tandem via the bus to enable independent execution of instructions, pipelining and/or multithreading. Additionally, or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an aspect of the disclosure by further configuration of the processor 202 by instructions for performing the algorithms and/or operations described herein.

In some aspects, the processor 202 may be configured to provide Internet-of-Things (IoT) related capabilities to users of the UE 104 disclosed herein. The IoT related capabilities may in turn be used to provide smart city solutions by providing real time weather and road updates, big data analysis, and sensor-based data collection for providing navigation and charging locations near critical areas. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training the machine learning model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one aspect, the network interface 206 may be configured to communicate with the sensor unit 104C disclosed in the detailed description of FIG. 1. In an alternative aspect, the network interface 206 may be configured to receive the sensor data from the OEM cloud 106 over the network 110 as described in FIG. 1. In some example aspects, the network interface 206 may be configured to receive location information of a user associated with a UE (such as, the UE 104), via the network 110. In accordance with an aspect, a controller of the UE 104 may receive the sensor data from a positioning system (for example: a GPS based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an aspect, the I/O interface 208 may obtain the sensor data from the OEM cloud 106 to store in the memory 202. The I/O interface 208 may include various input and output ports to connect various I/O devices that may communicate with different operational components of the system 102. In accordance with an aspect, the I/O interface 208 may be configured to output mitigation and/or confirmation of critical areas to a user device, such as, the UE 104 of FIG. 1.

In example aspects, the I/O interface 208 may be configured to provide the data associated with critical areas for EV travel to the database 108A to update the map of a certain geographic region. In accordance with an aspect, a user requesting information in a geographic region may be updated about historical (or static) road features, real-time or historical weather conditions, road conditions, road construction, etc. Examples of the input devices may include, but are not limited to, a touch screen, a keyboard, a mouse, a joystick, a microphone, and an image-capture device. Examples of the output devices may include, but are not limited to, a display, a speaker, a haptic output device or other sensory output devices.

In accordance with an aspect, the processor 202 may train the one or more machine learning models 210 to assist in determining a stranded electric vehicle resilience index of an area for an electric vehicle. In an aspect of the disclosure, the processor 202 may predict, based on the one or more trained machine learning models in conjunction with ground truth of the region, such as current features of a link to be traveled by the EV as derived from a map and one or more sensors along the link, a probability for the EV to be stranded on the link. In an aspect, a weighted linear regression model may be used to predict, based on the one or more trained machine learning models in conjunction with ground truth of the region, such as current features of a link to be traveled by the EV as derived from a map and one or more sensors along the link, a probability for the EV to be stranded on the link. In another aspect, a look-up table may be used for predicting, based on the one or more trained machine learning models in conjunction with ground truth of the region, such as current features of a link to be traveled by the EV as derived from a map and one or more sensors along the link, a probability for the EV to be stranded on the link.

In another aspect, a machine learning model, such as the one or more trained machine learning models 210 discussed earlier, may be used to determine a stranded electric vehicle resilience index of an area for an electric vehicle. In accordance with an aspect, the trained machine learning models 210 may be trained offline to obtain a classifier model to automatically predict, based on the one or more trained machine learning models in conjunction with ground truth of the region, such as current features of a link to be traveled by the EV as derived from a map and one or more sensors along the link, a probability for the EV to be stranded on the link. For the training of the trained machine learning models 210, different feature selection techniques and classification techniques may be used. The system 102 may be configured to obtain the trained machine learning models 210 and the trained machine learning models 210 may leverage historical information and real-time data to automatically predict, based on the one or more trained machine learning models in conjunction with ground truth of the region, such as current features of a link to be traveled by the EV as derived from a map and one or more sensors along the link, a probability for the EV to be stranded on the link. In one aspect, supervised machine learning techniques may be utilized where ground truth data is used to train the model for different scenarios and then in areas where there is not sufficient ground truth data, the trained machine learning models 210 can be used to predict features or results.

In an aspect, the trained machine learning model 210 may be complemented or substituted with a transfer learning model. The transfer learning model may be used when the contextual factors related to critical areas for an EV, such as traffic conditions; weather conditions; a number of driving lanes; a number of parking lanes on the link; a functional class of the link; a road width; a presence of physical divider; a road curvature; a road ascent/descent degree or slope; road work or road construction; or a presence of a tree or infrastructure on an edge of the road are unavailable, sparse, incomplete, corrupted or otherwise unreliable for predicting critical areas in a region. The transfer learning model may then use historical instances of critical areas for predicting critical in a new region.

In accordance with an aspect, various data sources may provide the historical and real-time information on critical areas for an EV, such as aggregations of locations and conditions leading to critical areas that may strand an EV detected on a particular link of a ride during a particular setting as an input to the machine learning models 210. Examples of the machine learning models 210 may include, but not limited to, Decision Tree (DT), Random Forest, and Ada Boost. In accordance with an aspect, the memory 204 may include processing instructions for training of the machine learning model 210 with data set that may be real-time (or near real time) data or historical data. In accordance with an aspect, the data may be obtained from one or more service providers.

FIG. 3 illustrates an example map or geographic database 307, which may include various types of geographic data 340. The database may be similar to or an example of the database 108B. The data 340 may include but is not limited to node data 342, road segment or link data 344, map object and point of interest (POI) data 346, EV resilience data records 348, or the like (e.g., other data records 350 such as traffic data, sidewalk data, road dimension data, building dimension data, vehicle dimension/turning radius data, etc.). Other data records may include computer code instructions and/or algorithms for executing a trained machine learning model that is capable of predicting critical areas for EVs.

A profile of end user mobility graph and personal activity information may be obtained by any functional manner including those detailed in U.S. Pat. Nos. 9,766,625 and 9,514,651, both of which are incorporated herein by reference. This data may be stored in one of more of the databases discussed above including as part of the EV resilience data records 348 in some aspects. This data may also be stored elsewhere and supplied to the system 102 via any functional means.

In one aspect, the following terminology applies to the representation of geographic features in the database 307. A "Node"—is a point that terminates a link, a "road/line segment"—is a straight line connecting two points, and a "Link" (or "edge") is a contiguous, non-branching string of one or more road segments terminating in a node at each end. In one aspect, the geographic database 307 follows certain conventions. For example, links do not cross themselves and do not cross each other except at a node. Also, there are no duplicated shape points, nodes, or links. Two links that connect each other have a common node.

The geographic database 307 may also include cartographic data, routing data, and/or maneuvering data as well as indexes 352. According to some example aspects, the road segment data records may be links or segments representing roads, streets, or paths, as may be used in calculating a route or recorded route information for determination of critical areas for EVs. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the geographic database 307 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The geographic database 307 can include data about the POIs and their respective locations in the POI records. The geographic database 307 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The geographic database 107 may be maintained by a content provider e.g., the map data service provider and may be accessed, for example, by the content or service provider processing server. By way of example, the map data service provider can collect geographic data and dynamic data to generate and enhance the map database and dynamic data such as weather- and traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The geographic database 307 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 307 may be a master geographic database, but in alternate aspects, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The EV resilience data records 348 may include various points of data such as, but not limited to: traffic conditions; weather conditions; a number of driving lanes; a number of parking lanes on the link; a functional class of the link; a road width; a presence of physical divider; a road curvature; a road ascent/descent degree or slope; road work or road construction; or a presence of a tree or infrastructure on an edge of the road, etc.

FIG. 4 illustrates a flowchart 400 for acts taken in an exemplary method for determining a stranded electric vehicle resilience index of an area for an electric vehicle, in accordance with an aspect. More, fewer or different steps may be provided. FIG. 4 is explained in conjunction with FIG. 1 to FIG. 3. The control starts at act 402.

At act 402, the system 102 may determine, from an application programming interface (API), one or more areas in a region with minimal EV charging capabilities. Data related to EVCP locations, numbers, types, availability, cost, service providers and other EVCP-related data may be provided by various services available by data aggregators, service providers, charging companies or other APIs allowing access to such data.

At act 404, the system 102 may train a first trained machine learning model to predict a first probability for a given EV to be stranded in the one or more areas based on a training feature dataset and the one or more areas in a region with minimal EV charging capabilities. In an aspect, the training feature dataset may include a vehicle type; a vehicle model; a battery level; a battery capacity; a battery type; a car load; traffic conditions; weather conditions; a time of day; a number of driving lanes; a number of parking lanes on the link; a functional class of the link; a road width; a presence of physical divider; a vehicle speed; a road curvature; a road ascent/descent degree or slope; road work or road construction; a presence of a tree or infrastructure on an edge of the road or a combination thereof At act 406, the system 102 may label the one or more areas as one or more critical areas based on the first probability for the given EV to be stranded in the one or more areas. In an aspect, the labeling operation may be done by human coding and labeling. In an aspect, the labeling operation may be performed using supervised learning, a look-up table, a database or other computer-assisted or generated means.

At act 408, the system 102 may generate a second trained machine learning model based on the labelled one or more critical areas. In an aspect, the system 102 may use a transfer learning model based on the second trained machine learning model in a new area different from the one or more areas used in generating the second trained machine learning model. In an aspect, the system 102 may generate the second trained machine learning model by using a mobility graph of historical data of one or more EV drivers in the one or more areas.

At act 410, the system 102 may predict, using the second trained machine learning model and current features of a link to be traveled by the EV as derived from a map and one or more sensors along the link, a second probability for the EV to be stranded on the link.

In an aspect, the system 102 may determine a minimum battery level that allows an arrival by the EV to a next charging point or an ability of the EV to safely exit the one or more critical areas. In an aspect, the system 102 may recommend based on the second trained machining learning model, to a driver of the EV to traverse the one or more critical areas only with at least the minimum battery level. In an aspect, the system 102 may include a vehicle interface device to provide a notification to a driver of the EV to charge the EV before entering the one or more critical areas or recommend a different route to avoid the one or more critical areas. In an aspect of the disclosure, the vehicle interface device may include a vehicle IVI, audio speakers, touch screens, a UI or GUI on a screen or mobile device screen, haptic or tactile interfaces and alerts and/or other interface devices known to one of skill in the art.

It may be contemplated that various applications of the disclosed system 102 may arise in usage. In an aspect, once the ML models have been trained and the system 102 has identified the contexts (locations/areas, time, weather, etc) leading to unsafe or improper areas to enter with a given battery level, some applications the system 102 could contextually make use of may include:

- Mapping applications: Showing on the map the "critical areas" (e.g. at this time of the day or under current context of traffic and weather conditions);
- Routing: the system 102 may consider such input for a routing algorithm to avoid "critical areas" when possible or make necessary charging stops before
- Guidance: the system 102 may be configured to make audio guidance outputs such as: "Pay attention, you will soon enter a 'critical area' and your battery level is very low, please consider the following options XYZ";
- Visual guidance/warnings: the system 102 may visually highlight the areas/street having higher disruption risks;
- Reminders or contextual recommendations: how to reduce or avoid the risk of being stranded by applying some of the recommendations listed above, in addition to properly charge the vehicle ahead of time.

Autonomous vehicles (AVs) may also face similar issues in the future such that the disclosed system 102 could also be applied to these types of vehicles and enhance their reliability and safety. Naturally, some of the decisions involving the output and recommendations of the system 102 would need to be taken by the system 102 instead of the EV drivers.

In an aspect, the disclosed system 102 may be employed such that the use of such prediction models in ADAS features may make roads safer. Indeed, reducing the likelihood of stranded vehicles, especially on highways, would greatly reduce the risks of accidents in those areas. Other applications and implementations of the system 102 may arise to improve the safety of EVs, AVs and conventional vehicles by preventing stranded and immobilized vehicles on highways and in congested or narrow roads.

Blocks of the flowchart 400 support combinations of means for performing the specified functions and combinations of operations for performing the specified functions for performing the specified functions. It will also be understood that one or more blocks of the flowchart 500, and combinations of blocks in the flowchart 500, can be implemented by special purpose hardware-based computer systems which perform the specified functions, or combinations of special purpose hardware and computer instructions.

Alternatively, the system may comprise means for performing each of the operations described above. In this regard, according to an example aspect, examples of means for performing operations may comprise, for example, the processor 202 and/or a device or circuit for executing instructions or executing an algorithm for processing information as described above.

Although the aforesaid description of FIGS. 1-4 is provided with reference to the sensor data, however, it may be understood that the disclosure would work in a similar manner for different types and sets of data as well. The system 102 may generate/train the machine learning models 210 to evaluate different sets of data at various geographic locations. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an aspect of the present disclosure and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer implemented method to determine a stranded electric vehicle resilience index of an area for an electric vehicle (EV), the method comprising:

determining, from an application programming interface (API), one or more areas in a region with minimal EV charging capabilities;

generating a first trained machine learning model to predict a first probability for a given EV to be stranded in the one or more areas based on a training feature dataset and the one or more areas in a region with minimal EV charging capabilities;

labelling the one or more areas as one or more critical areas based on the first probability for the given EV to be stranded in the one or more areas;

generating a second trained machine learning model based on the labelled one or more critical areas;

predicting, using the second trained machine learning model and current features of a link to be traveled by the EV as derived from a map and one or more sensors along the link, a second probability for the EV to be stranded on the link;

determining, for at least one of the one or more areas, the stranded electric vehicle resilience index based on a disruptive potential of the EV being stranded in the area under one or more contextual conditions; and providing, based on the second probability, at least one of:

(i) a notification to a driver of the EV to charge the EV before entering the one or more critical areas, or (ii) a route recommendation to avoid the one or more critical areas.

2. The method of claim 1, further comprising determining a minimum battery level that allows an arrival by the EV to a next charging point or an ability of the EV to safely exit the one or more critical areas.

3. The method of claim 2, further comprising recommending, based on the second trained machining learning model, to a driver of the EV to traverse the one or more critical areas only with at least the minimum battery level.

4. The method of claim 1, where the training feature dataset comprises at least one of a vehicle type; a vehicle model; a battery level; a battery capacity; a battery type; a car load; traffic conditions; weather conditions; a time of day; a number of driving lanes; a number of parking lanes on the link; a functional class of the link; a road width; a presence of physical divider; a vehicle speed; a road curvature; a road ascent/descent degree or slope; road work or road construction; a presence of a tree or infrastructure on an edge of the road or a combination thereof.

5. The method of claim 1, further comprising using a transfer learning model based on the second trained machine learning model in a new area different from the one or more areas used in generating the second trained machine learning model.

6. The method of claim 1, further comprising generating the second trained machine learning model by using a mobility graph of historical data of one or more EV drivers in the one or more areas.

7. The method of claim 1, further comprising providing a notification to a driver of the EV to charge the EV before entering the one or more critical areas or recommend a different route to avoid the one or more critical areas.

8. A system to determine a stranded electric vehicle resilience index of an area for an electric vehicle (EV), comprising:

at least one memory configured to store computer executable instructions; and at least one processor configured to execute the computer executable instructions to:

determine, from an application programming interface (API), one or more areas in a region with minimal EV charging capabilities;

generate a first trained machine learning model to predict a first probability for a given EV to be stranded in the one or more areas based on a training feature dataset and the one or more areas in a region with minimal EV charging capabilities;

label the one or more areas as one or more critical areas based on the first probability for the given EV to be stranded in the one or more areas;

generate a second trained machine learning model based on the labelled one or more critical areas;

predict, using the second trained machine learning model and current features of a link to be traveled by the EV as derived from a map and one or more sensors along the link, a second probability for the EV to be stranded on the link; and determining, for at least one of the one or more areas, the stranded electric vehicle resilience index based on a disruptive potential of the EV being stranded in the area under one or more contextual conditions; and providing, based on the second probability, at least one of:

(i) a notification to a driver of the EV to charge the EV before entering the one or more critical areas, or (ii) a route recommendation to avoid the one or more critical areas.

9. The system of claim 8, further comprising computer executable instructions to determine a minimum battery level that allows an arrival by the EV to a next charging point or an ability of the EV to safely exit the one or more critical areas.

10. The system of claim 9, further comprising computer executable instructions to recommend, based on the second trained machining learning model, to a driver of the EV to traverse the one or more critical areas only with at least the minimum battery level.

11. The system of claim 8, where the training feature dataset comprises at least one of a vehicle type; a vehicle model; a battery level; a battery capacity; a battery type; a car load; traffic conditions; weather conditions; a time of day; a number of driving lanes; a number of parking lanes on the link; a functional class of the link; a road width; a presence of physical divider; a vehicle speed; a road curvature; a road ascent/descent degree or slope; road work or road construction; a presence of a tree or infrastructure on an edge of the road or a combination thereof.

12. The system of claim 8, further comprising computer executable instructions to use a transfer learning model based on the second trained machine learning model in a new area different from the one or more areas used in generating the second trained machine learning model.

13. The system of claim 8, further comprising computer executable instructions to generate the second trained machine learning model by using a mobility graph of historical data of one or more EV drivers in the one or more areas.

14. The system of claim 8, further comprising computer executable instructions to provide a notification to a driver of the EV to charge the EV before entering the one or more critical areas or recommend a different route to avoid the one or more critical areas.

15. The system of claim 8, further comprising a vehicle interface device to provide a notification to a driver of the EV to charge the EV before entering the one or more critical areas or recommend a different route to avoid the one or more critical areas.

16. A computer program product comprising a non-transitory computer readable medium having stored thereon computer executable instructions, which when executed by one or more processors, cause the one or more processors to carry out operations to determine a stranded electric vehicle resilience index of an area for an electric vehicle (EV), the operations comprising:

determining, from an application programming interface (API), one or more areas in a region with minimal EV charging capabilities;

generating a first trained machine learning model to predict a first probability for a given EV to be stranded in the one or more areas based on a training feature dataset and the one or more areas in a region with minimal EV charging capabilities;

labelling the one or more areas as one or more critical areas based on the first probability for the given EV to be stranded in the one or more areas;

generating a second trained machine learning model based on the labelled one or more critical areas; and predicting, using the second trained machine learning model and current features of a link to be traveled by the EV as derived from a map and one or more sensors along the link, a second probability for the EV to be stranded on the link;

determining, for at least one of the one or more areas, the stranded electric vehicle resilience index based on a disruptive potential of the EV being stranded in the area under one or more contextual conditions; and providing, based on the second probability, at least one of:

(i) a notification to a driver of the EV to charge the EV before entering the one or more critical areas, or (ii) a route recommendation to avoid the one or more critical areas.

17. The computer program product of claim 16, further comprising determining a minimum battery level that allows an arrival by the EV to a next charging point or an ability of the EV to safely exit the one or more critical areas.

18. The computer program product of claim 17, further comprising operations for recommending, based on the second trained machining learning model, to a driver of the EV to traverse the one or more critical areas only with at least the minimum battery level.

19. The computer program product of claim 16, further comprising operations for using a transfer learning model based on the second trained machine learning model in a new area different from the one or more areas used in generating the second trained machine learning model.

20. The computer program product of claim 16, further comprising operations for generating the second trained machine learning model by using a mobility graph of historical data of one or more EV drivers in the one or more areas.

* * * * *